United States Patent [19]
Sakamoto et al.

[11] Patent Number: 5,632,089
[45] Date of Patent: May 27, 1997

[54] SABER SAW ASSEMBLY WITH IMPROVED VISING MECHANISM

[75] Inventors: Siyouiti Sakamoto; Kazumi Takeishi, both of Katsuta; Hiroaki Orikasa, Nakaminato; Takahiko Shimada, Ibaraki-ken, all of Japan

[73] Assignee: Hitachi Koki Company Ltd., Japan

[21] Appl. No.: 284,210

[22] Filed: Aug. 2, 1994

[30] Foreign Application Priority Data

Aug. 20, 1993 [JP] Japan .................... 5-205969
Mar. 4, 1994 [JP] Japan .................... 6-034652

[51] Int. Cl.⁶ .................................... B27B 19/00
[52] U.S. Cl. .................... 30/92; 30/372; 83/745
[58] Field of Search .................... 30/92, 372, 392; 83/745; 81/167

[56] References Cited

U.S. PATENT DOCUMENTS 2,227,844  1/1941  Roche .................................... 30/92
2,748,641  6/1956  Calello .................................. 81/167 X
3,834,019  9/1974  Smeltzer et al. ........................ 30/92

FOREIGN PATENT DOCUMENTS 2-6983   2/1990  Japan .
4-37691  9/1992  Japan .

*Primary Examiner*—Douglas D. Watts
*Attorney, Agent, or Firm*—Rossi & Associates

[57]  ABSTRACT

A saber saw assembly includes a vice for clamping an object to be cut and a saber saw having a saw blade to be operated in reciprocating motion. The saber saw is arranged to cut the object with the reciprocating saw blade while the object is clamped by the vice. The vice is in the form of a pipe wrench. The pipe wrench clamps the object when rotated in a clamping direction while releases the object when rotated in a releasing direction opposite to the clamping direction. Accordingly, by using the pipe wrench for the vice, the clamping and releasing operations for the object are simplified to enhance the working efficiency for cutting the object.

8 Claims, 3 Drawing Sheets

SABER SAW ASSEMBLY WITH IMPROVED VISING MECHANISM

BACKGROUND OF THE INVENTION

1. Field of the Invention

The present invention relates to a saber saw assembly composed of a saber saw and a vice, wherein an object to be cut, such as, a pipe is cut by a reciprocating saw blade while being vised or clamped by the vice.

2. Description of the Prior Art

In a conventional saber saw assembly, a chain is used to vise or clamp an object to be cut, e.g. a pipe or the like as disclosed in, such as, Japanese Second (examined) Utility Model Publications Nos. 2-6983 and 4-37691. While the object is clamped by the chain, a saw blade is driven in reciprocating motion so as to cut the object.

FIG. 5 shows one type of the conventional saber saw assembly which uses a chain 1 for clamping a pipe 2. The chain 1 has one end fixedly coupled to a vice body 4 and the other end held by a movable hooking portion provided in the vice body 4. By rotating a screw rod handle 3, the hooking portion is displaced to tighten or loosen the chain 1 around the pipe 2. Accordingly, by rotating the screw rod handle 3 in a given direction, the pipe 2 is firmly clamped between the chain 1 and a V-shaped receiving surface 9 formed on the vice body 4. A mounting rod 5 is fixedly provided on the vice body 4 so as to extend in parallel to an axis of the pipe 2 when the pipe 2 is clamped as described above. On the other hand, a saber saw body 6 has a gear case 7 formed with a corresponding mounting hole 8. The mounting hole 8 receives therein a distal end portion of the mounting rod 5 so that the saber saw body 6 is pivotal about the mounting rod 5 to cut the pipe 2 with a saw blade 10 operated in reciprocating motion.

In the foregoing conventional saber saw assembly, however, since the chain 1 is used to clamp the pipe 2 while cutting it, winding and unwinding of the chain 1 around and from the pipe 2 are required before and after cutting the pipe 2, respectively. This inevitably deteriorates the working efficiency for the pipe cutting, which should be improved.

Further, in the foregoing conventional saber saw assembly, the screw rod handle 3 should be operated for clamping the pipe 2 before cutting and for releasing the pipe 2 after cutting even when successively cutting the pipes each having the identical diameter. This also deteriorates the working efficiency for the pipe cutting and should be improved.

In another type of the conventional saber saw assembly as shown in, such as, the foregoing Japanese Second (examined) Utility Model Publication No. 4-37691, the chain 1 in FIG. 5 is replaced by a fixing screw rod. The fixing screw rod is arranged perpendicular to the axis of the pipe 2 so as to interpose the pipe 2 between a tip of the fixing screw rod and the V-shaped receiving surface 9. Accordingly, by rotating the fixing screw rod in a given direction, the fixing screw rod advances toward the V-shaped receiving surface 9 so as to firmly clamp the pipe 2 therebetween.

In the latter type of the conventional saber saw assembly, although the chain is not used for clamping the pipe 2 as opposed to the former conventional type, the fixing screw rod should be operated for clamping the pipe 2 before cutting and for releasing the pipe 2 after cutting even when successively cutting the pipes of the identical diameter. As described above, this should be improved for enhancing the working efficiency.

SUMMARY OF THE INVENTION

Therefore, it is an object of the present invention to provide a saber saw assembly having an improved vising mechanism.

According to one aspect of the present invention, a saber saw assembly comprises a vice in the form of a pipe wrench for clamping an object to be cut; and a saber saw having a saw blade to be operated in reciprocating motion, the saber saw cutting the object with the reciprocating saw blade while the object is clamped by the pipe wrench vice.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described hereinbelow with reference to the accompanying drawings.

Figure 1:
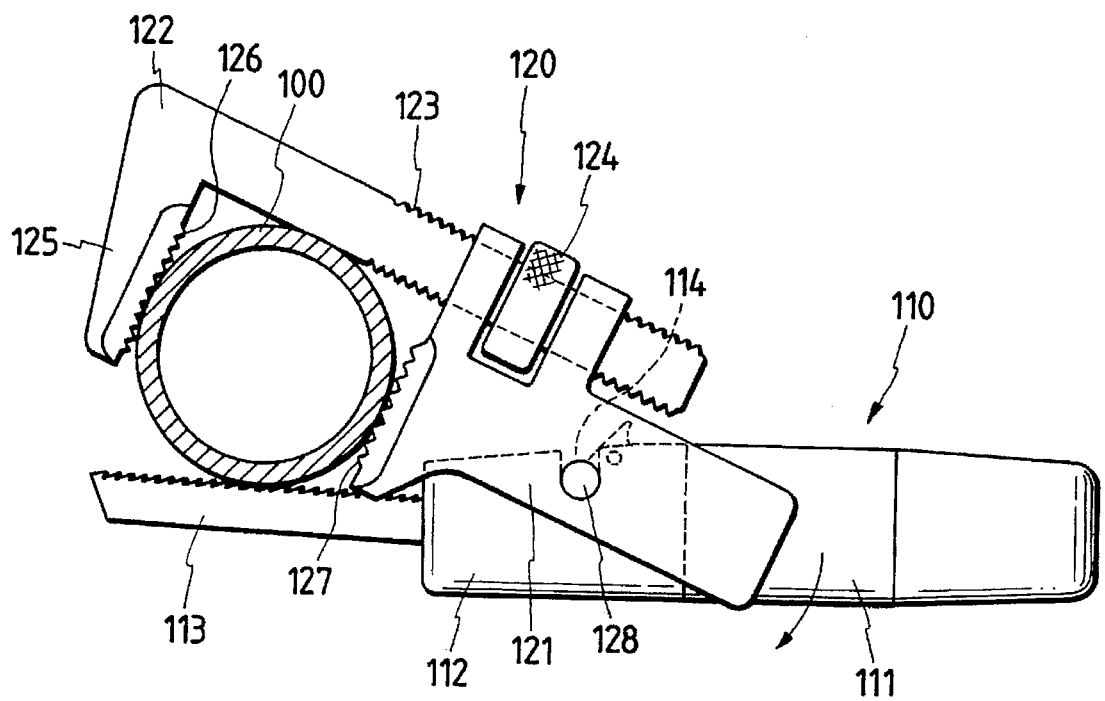
FIG. 1 is a side elevational view showing a saber saw assembly according to a first preferred embodiment of the present invention, wherein the saber saw assembly is in operation to cut an object to be cut.

In FIG. 1, a saber saw assembly according to a first preferred embodiment includes a saber saw 110 and a vice 120.

The saber saw 110 has a saber saw body 111 which incorporates therein an electric motor (not shown). The saber saw body 111 is provided at its tip portion with a gear case 112 which includes therein a rotational/reciprocating motion conversion means, such as, a crank mechanism (not shown). A saw blade 113 extends forward from the gear case 112 and is operated in reciprocating motion by means of the electric motor via the motion conversion means in the gear case 112.

Since the foregoing structure of the saber saw 110 is well known in the art, no further detailed description will be made therefor.

On an upper surface, in FIG. 1, of the gear case 112 is formed a later-described mounting groove 114.

The vice 120 is in the form a pipe wrench. Specifically, the pipe wrench vice 120 is composed of a fixed base 121, an L-shaped rod 122 having a threaded portion 123 which passes through a pair of spaced mounting projections of the fixed base 121, and an operation nut 124 arranged between the pair of the spaced mounting projections of the fixed base 121 and engaging the threaded portion 123 of the L-shaped rod 122 therebetween. By rotating the operation nut 124, the L-shaped rod 122 displaces axially of the threaded portion 123.

The L-shaped rod 122 has a bent portion 125 being bent relative to the axis of the threaded portion 123. The bent portion 125 is formed with a saw-toothed surface 126 which is arranged perpendicular relative to the axis of the threaded portion 123. The fixed base 121 also has a saw-toothed surface 127 which is also arranged perpendicular relative to the axis of the threaded portion 123. Specifically, as shown in FIG. 1, the saw-toothed surfaces 126 and 127 are arranged to confront each other for vising or clamping a pipe 100 therebetween.

As described above, the vice 120 is in the form of the pipe wrench. Accordingly, as is well known in the art, the pipe wrench vice 120 operates in the following manner:

It is assumed that the pipe 100 is interposed between the saw-toothed surfaces 126 and 127 with a distance between the surfaces 126 and 127 being adjusted by the operation nut 124 to match an outer diameter of the pipe 100. In this state, when the fixed base 121 is slightly rotated clockwise in FIG. 1, the saw-toothed surfaces 126 and 127, that is, the sawteeth formed on the surfaces 126 and 127, firmly engage with or bite into the pipe 100 so as to clamp the pipe 100 therebetween. To the contrary, when the fixed base 121 is rotated counterclockwise in FIG. 1, the sawteeth on the surfaces 126 and 127 slide on the pipe 100 so that the pipe wrench vice 120 is easily disengaged from the pipe 100.

Since the pipe wrench itself is well known in the art, no further detailed structure thereof will be made hereinbelow.

Figure 2:
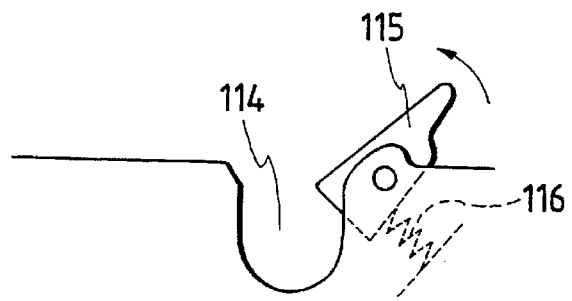
FIG. 2 is an enlarged view showing a structure provided on a gear case of a saber saw for mounting a mounting rod attached to a pipe wrench vice.
Figure 3:
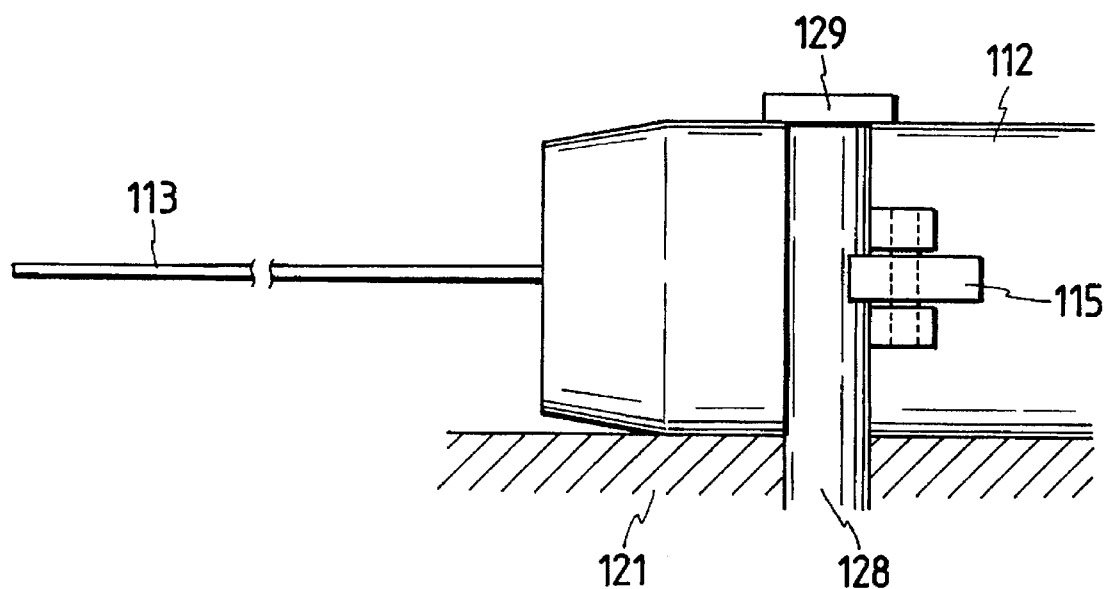
FIG. 3 is a diagram schematically showing an upper side of a part of the saber saw assembly in FIG. 1 for explaining a state where the mounting rod attached to the pipe wrench vice is mounted in the structure shown in FIG. 2.

A mounting rod 128 fixedly extends from a side surface of the fixed base 121 of the pipe wrench vice 120 as best shown in FIG. 3. The mounting rod 128 extends in perpendicular to the threaded portion 123 of the L-shaped rod 122 or in an axial direction of the pipe 100 when the pipe 100 is clamped between the saw-toothed surfaces 126 and 127. The mounting rod 128 is received in the foregoing mounting groove 114 formed on the gear case 112 so that the saber saw 110 is pivotally coupled to the pipe wrench vice 120. Specifically, as shown in FIGS. 1 to 3, the mounting groove 114 is provided with a pivotal locking pawl 115 which is urged by a compression spring 116 in a direction opposite to an arrow in FIG. 2 for holding the mounting rod 128 in the mounting groove 114 under pressure caused by the compression spring 116. This structure effectively prevents the mounting rod 128, that is, the pipe wrench vice 120 from coming off the mounting groove 114, that is, the saber saw 110. As shown in FIG. 3, the mounting rod 128 has a flange 129 at its distal end for providing a fixed positional relationship between the saber saw 110 and the pipe wrench vice 120 in the axial direction of the mounting rod 128 or the pipe 100.

The saber saw assembly as structured above operates in the following manner:

As described above, the saw-toothed surfaces 126 and 127 bite into the pipe 100 to clamp it therebetween by slightly rotating the fixed base 121 clockwise in FIG. 1. While the pipe 100 is clamped, the mounting rod 128 fixed to the pipe wrench vice 120 is received in the mounting groove 114 in the manner as described above so that the saber saw 110 is pivotally coupled to the pipe wrench vice 120. In this state, the saw blade 113 is operated in reciprocating motion to cut the pipe 100. Specifically, while the saw blade 113 is in operation, the saber saw 110 is manually turned clockwise as shown by an arrow in FIG. 1 to make a pivotal movement about the mounting rod 128. Accordingly, in FIG. 1, the saber saw body 111 makes a clockwise downward movement while the reciprocating saw blade 113 makes a clockwise upward movement to cut the pipe 100. As appreciated, the clockwise downward movement of the saber saw body 111 applies a force to the fixed base 121 of the pipe wrench vice 120 via the mounting rod 128 so as to turn the pipe wrench vice 120 clockwise in FIG. 1. Accordingly, the pipe wrench vice 120 is allowed to clamp the pipe 100 more firmly so that the cutting of the pipe 100 can be performed smoothly and precisely.

After cutting the pipe 100, the saw saber 110 is disengaged from the pipe wrench vice 120 by rotating the locking pawl 115 counterclockwise against the biasing force of the compression spring 116 as indicated by an arrow in FIG. 2 so as to release the mounting rod 128 from within the mounting groove 114.

Thereafter, the pipe wrench vice 120 is disengaged from the pipe 100 by rotating the fixed base 121 counterclockwise in FIG. 1.

As appreciated from the foregoing description, the first preferred embodiment makes it much simpler and easier to clamp and release the pipe 100 so that the working efficiency of the pipe cutting is significantly improved. Particularly, the working efficiency for successively cutting the pipes of the identical diameter is highly improved.

Now, a saber saw assembly according to a second preferred embodiment of the present invention will be described hereinbelow.

Figure 4:
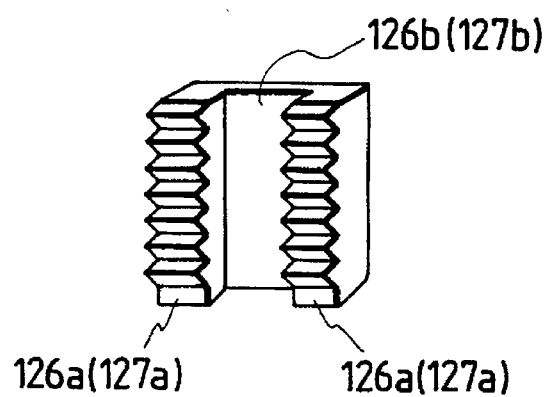
FIG. 4 is a perspective view showing saw-toothed surfaces formed on at least one of a bent portion of an L-shaped rod of the pipe wrench vice and a fixed base of the pipe wrench vice, according to a second preferred embodiment of the present invention.
Figure 5:
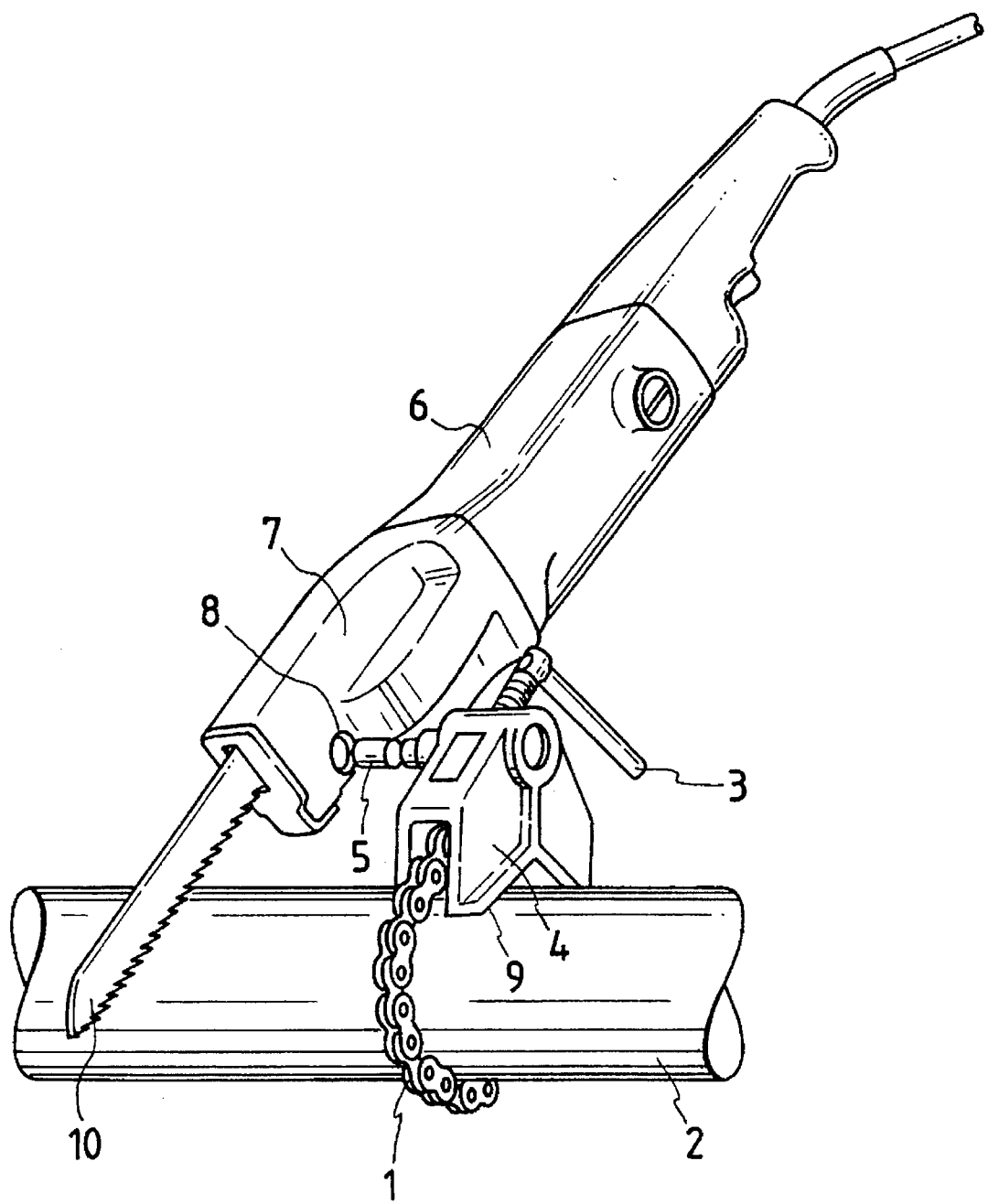
FIG. 5 is a perspective view showing a conventional saber saw assembly, wherein the saber saw assembly is in operation to cut an object to be cut.

In the second preferred embodiment, at least one of the bent portion 125 of the L-shaped rod 122 and the fixed base 121 has a pair of saw-toothed surfaces 126a, 126a or 127a, 127a as shown in FIG. 4, in place of the foregoing saw-toothed surface 126 or 127 in the first preferred embodiment. Specifically, as shown in FIG. 4, the saw-toothed surfaces 126a, 126a or 127a, 127a are arranged in parallel with each other with a recessed portion 126b or 127b interposed therebetween. Like the saw-toothed surface 126 or 127, each saw-toothed surface 126a or 127a is arranged in perpendicular relative to the axis of the threaded portion 123 for engagement with the pipe 100 while clamping it.

Accordingly, in the second preferred embodiment, at least one side of the pipe 100 is vised or clamped by the two saw-toothed surfaces 126a, 126a or 127a, 127a.

The other structure of the saber saw assembly of the second preferred embodiment is the same as that of the first preferred embodiment.

The structure of the second preferred embodiment is advantageous for the following reason:

When a force is applied to the pipe wrench vice 120 along the axis of the pipe 100 during the pipe wrench vice 120 clamping the pipe 100, a clamping force of the pipe wrench vice 120 is reduced. This force tends to be exerted on the pipe wrench vice 120 due to a bending moment which is applied to the pipe wrench vice 120 via the mounting rod 128 when the saber saw 110 is coupled to the pipe wrench vice 120 or when the saber saw body 111 makes the foregoing clockwise downward movement during the cutting of the pipe 100. Accordingly, by clamping at least one side of the pipe 100 with the two saw-toothed surfaces 126a, 126a or 127a, 127a, the reliable clamping of the pipe 100 is ensured even when the foregoing force induced by the bending moment is applied to the pipe wrench vice 120 along the axis of the pipe 100.

It is to be understood that this invention is not to be limited to the preferred embodiments and modifications described above, and that various changes and modifications may be made without departing from the spirit and scope of the invention as defined in the appended claims.

What is claimed is:

1. A saber saw assembly comprising:

a vice for clamping an object to be cut; and a saber saw having a saw blade to be operated in reciprocating motion, said saber saw cutting said object with the reciprocating saw blade while said object is clamped by said vice;

wherein said vice is in the form of a pipe wrench;

wherein said vice clamps said object when rotated in a clamping direction and releases said object when rotated in a releasing direction; and wherein said saber saw is coupled to said vice so as to apply a force to said vice in said clamping direction when said saber saw is displaced relative to said vice for cutting said object.

2. The saber saw assembly as set forth in claim 1, wherein said saber saw is pivotally displaced relative to said vice for cutting said object.

3. The saber saw assembly as set forth in claim 1, wherein said saber saw is displaced clockwise relative to said vice for cutting said object.

4. The saber saw assembly as set forth in claim 1, wherein said vice includes a fixed base and a member held by said fixed base so as to be adjustable in position relative to said fixed base, and wherein said fixed base has a first surface and said member has a second surface confronting said first surface, each of said first and second surfaces having a saw-toothed surface for clamping said object therebetween.

5. The saber saw assembly as set forth in claim 4, wherein said saw-toothed surface of at least one of said first and second surfaces comprises a pair of saw-toothed surfaces with a recessed portion interposed therebetween.

6. The saber saw assembly as set forth in claim 4, wherein a mounting rod is fixed to said fixed base of the vice so as to extend in an axial direction of said object when said object is clamped between said saw-toothed surfaces and a corresponding mounting groove is provided on said saber saw at a portion other than said saw blade, and wherein said vice and said saber saw are coupled by inserting said mounting rod into said mounting groove.

7. A saber saw assembly comprising:

a vice for clamping an object to be cut; and a saber saw having a saw blade to be operated in reciprocating motion, said saber saw cutting said object with the reciprocating saw blade while said object is clamped by said vice;

wherein said vice is in the form of a pipe wrench;

wherein said vice includes a fixed base and a member held by said fixed base so as to be adjustable in position relative to said fixed base;

wherein said fixed base has a first surface and said member has a second surface confronting said first surface, each of said first and second surfaces having a saw-toothed surface for clamping said object therebetween;

wherein a mounting rod is fixed to said fixed base of the vice so as to extend in an axial direction of said object when said object is clamped between said saw-toothed surfaces and a corresponding mounting groove is provided on said saber saw at a portion other than said saw blade;

wherein said vice and said saver saw are coupled by inserting said mounting rod into said mounting groove; and wherein locking means is pivotally provided at said mounting groove for biasing said mounting rod received in said mounting groove so as to prevent said mounting rod from disengaging from said mounting groove.

8. The saber saw assembly as set forth in claim 7, wherein said locking means comprises a locking pawl pivotally provided at said mounting groove and a compression spring for biasing said locking pawl in a direction so as to prevent said mounting rod from coming off said mounting groove.

* * * * *